United States Patent [19]

Levendis et al.

[11] Patent Number: 5,253,476
[45] Date of Patent: Oct. 19, 1993

[54] PULSED, REVERSE-FLOW, REGENERATED DIESEL TRAP CAPTURING SOOT, ASH AND PAH'S

[75] Inventors: Yiannis A. Levendis, Boston; Najib Kahlil, Quincy, both of Mass.

[73] Assignee: Northeastern University, Boston, Mass.

[21] Appl. No.: 839,171
[22] Filed: Feb. 21, 1992
[51] Int. Cl.⁵ .............................................. F01N 3/02
[52] U.S. Cl. .................................... 60/279; 55/302; 55/DIG. 30; 60/288; 60/311
[58] Field of Search .................. 60/279, 311, 288, 279, 60/311; 55/302, DIG. 30

[56] References Cited

U.S. PATENT DOCUMENTS

| | | | |
|---|---|---|---|
| 4,290,263 | 9/1981 | Mann et al. | 60/311 |
| 4,319,453 | 3/1982 | Mann | 60/309 |
| 4,327,188 | 4/1982 | Endo et al. | 501/134 |
| 4,329,162 | 5/1982 | Pitcher, Jr. | 55/523 |
| 4,406,119 | 9/1983 | Kayima et al. | 60/275 |
| 4,433,986 | 2/1984 | Borst | 55/272 |
| 4,462,812 | 7/1984 | Bly et al. | 55/502 |
| 4,478,618 | 10/1984 | Bly et al. | 55/314 |
| 4,584,003 | 4/1986 | Oda et al. | 55/269 |
| 4,697,615 | 10/1987 | Tsuchimoto et al. | 137/340 |
| 4,730,454 | 3/1988 | Pischinger | 60/311 |
| 4,787,443 | 11/1988 | Fukatsu et al. | 165/165 |
| 4,833,883 | 5/1989 | Oda | 60/279 |
| 4,875,335 | 10/1989 | Arai | 60/311 |
| 4,935,042 | 6/1990 | Sudo et al. | 55/523 |
| 5,013,340 | 5/1991 | Taslim et al. | 55/290 |
| 5,073,178 | 12/1991 | Mimori et al. | 55/523 |
| 5,123,243 | 6/1992 | Baddour | 60/279 |

FOREIGN PATENT DOCUMENTS

| | | | |
|---|---|---|---|
| 0121445 | 10/1984 | European Pat. Off. | |
| 0213725 | 3/1987 | European Pat. Off. | |
| 0220588 | 5/1987 | European Pat. Off. | |
| 0230140 | 7/1987 | European Pat. Off. | |
| 56-98518 | 8/1981 | Japan | |
| 56-124417 | 9/1981 | Japan | |
| 56-129020 | 10/1981 | Japan | |
| 61-268813 | 11/1986 | Japan | |
| 62-96719 | 5/1987 | Japan | |
| 2064360 | 6/1981 | United Kingdom | |
| 2097283 | 11/1982 | United Kingdom | 60/279 |

OTHER PUBLICATIONS

Y. Levendis et al., "Development of a Self-Cleaning Particle Trap for Diesel Engine Particulate Control", SAE Techical Paper Series, No. 900610, Feb. 26-Mar. 2, 1990, pp. 195-201.
K. Takesa et al., "Development of Particulate Trap System with Cross Flow Ceramic Filter and Reverse Cleaning Regeneration", SAE Technical Paper Series, No. 910,326, pp. 109-120.
A. Matsunuma et al., "Status of Particulate Trap System for a Heavy Duty Diesel Truck", SAE Technical Paper Series, No. 910132, pp. 29-35.
T. Igarashi et al., "Development of Diesel Particulate Trap Systems for City Buses", SAE Technical Paper Series, No. 910138, pp. 83-92.
Y. Levendis et al., "Evaluation of a Self-Cleaning Particulate Control System for Diesel Engines", SAE Technical Paper Series, No. 910333, pp. 183-193.
"Cellular Ceramic Products Help Curb Diesel Engine Emissions", Automotive Engineering, vol. 100, No. 1, Jan. 1992, pp. 21-25.
Corning, "Celcor Dieselfilters", Jun. 1987.

Primary Examiner—Douglas Hart
Attorney, Agent, or Firm—Weingarten, Schurgin, Gagnebin & Hayes

[57] ABSTRACT

A simple, low cost and reliable total particulate (soot, polynuclear aromatic and aliphatic hydrocarbons and ash) control system is disclosed that separates the particulate burning process from the body of a particulate filter and that needs very little compressed air to regenerate. The system can retrofit any existing diesel-powered equipment. The particulate control system includes a stationary ceramic monolith trap that is regenerated by one or more pulses of high-pressure and low-velocity air that move in the opposite direction of the engine exhaust flow through the trap. The particulate control system in a single trap embodiment conducts the engine exhaust to the atmosphere during regeneration periods, and in a dual trap embodiment, conducts the engine exhaust through two traps that are operated alternatively such that while one is filtering the exhaust the other is being regenerated, and vice versa.

27 Claims, 6 Drawing Sheets

PULSED, REVERSE-FLOW, REGENERATED DIESEL TRAP CAPTURING SOOT, ASH AND PAH'S

FIELD OF THE INVENTION

This invention is directed to the field of gas filtration, and more particularly, to an air pulse regenerated diesel particulate and PAH (polynuclear aromatic hydrocarbon) filtration system.

BACKGROUND OF THE INVENTION

Unwanted particulate matter (in the form of soot, that is comprised of carbon, ash, that is comprised of inorganics, and PAH's, that are comprised of organic polynuclear hydrocarbons condensed about the carbon nuclei of the soot) is entrained in the emission stream of diesel engines. Porous ceramic and other filters that are able to capture the soot in the pores thereof are being evaluated as to their suitability for implementing the existing (1991) and future (1994 and 1998) federal and other regulations governing diesel particulate emission into the ambient atmosphere.

The soot is "sticky" and adheres quite readily to the walls defining the pores of the ceramic and other traps. With the prolongation of filtration, the soot so accumulates in the filters as to obstruct the pores, inducing thereby a back pressure that reduces the effective throughput of the filters and necessitates the cleaning of the filters.

While thermal regeneration to remove the accumulated soot from the filters is known, such as by embedding resistive filaments in the ceramic matrix that oxidize the accumulated soot when energized, because hot spots tend to be formed thereby, not only is care required to prevent degradation of the filter matrix in the locale of the hot spots but also degraded filters must be periodically monitored to ensure that they comply with the clean air emission standards. The PAH's entrained in the diesel exhaust condense at and around two-hundred (200) to four-hundred (400) degrees Centigrade. Traps which employ thermal regeneration techniques are generally located at the diesel exhaust manifold close to the engine and typically operate at temperatures well above the boiling point of the PAH's, which makes them generally unsuited to PAH emission control. Moreover, these thermally regenerated traps are prone to failure by melting and cracking of the ceramic matrix during the high-temperature regeneration periods.

In commonly assigned U.S. Pat. No. 5,013,340, entitled "Rotating Diesel Particulate Trap", incorporated herein by reference, soot is continuously removed by so rotating a particulate trap that while one sector thereof is exposed to diesel exhaust flowing in one direction another sector thereof is exposed to a counter flowing stream of low-pressure and high-velocity (high-mass) air provided either by a fan or a compressed air tank. The filter is rotatably mounted by a bearing assembly and is driven by an electric motor or belt connecting an axle to the drive shaft of the diesel engine whose exhaust is to be filtered, and rotary seals are provided to prevent cross-contamination of the exhaust and cleaning air streams.

SUMMARY OF THE INVENTION

The present invention discloses as its principal object a ceramic diesel soot, ash and PAH trap that is stationary, thereby eliminating the need for rotary mounts and seals, that has a temperature below the temperature at which PAH's condense, thereby enabling their capture and/or destruction, and that is regenerated by at least one low-duty-cycle high-pressure and low-velocity (low-mass) pulse of air, thereby enabling long-term reverse-flow regeneration without materially depleting the charge of a compressed air tank, and therewith ensuring low power consumption by the regeneration subsystem. By removing ash, soot and PAH's, the present invention enables dirtier fuel to be burned while still meeting the federal clean air standards.

In one embodiment, a single stationary particulate and PAH trap is employed, wherein the diesel exhaust is switched to atmosphere during the on-time of the one or more low-duty-cycle regenerating pulses. In another embodiment, a pair of parallel, stationary particulate and PAH traps are provided, and the diesel exhaust is filtered in one of the traps while the other is being regenerated by one or more low-duty-cycle regeneration pulses. In either embodiment, the one or more low-duty-cycle regeneration pulses can be produced either by gating one or more high-pressure and low-velocity air pulses to the corresponding trap or by so building up pressure in the corresponding trap and gating it as to provide one or more high-pressure and low-velocity pressure pulses of low-duty-cycle. In either embodiment, a controller may be provided either to regenerate the filters periodically or in response to the back pressure in the corresponding trap whenever the back pressure reaches a predetermined pressure level. In an exemplary embodiment, at least one pulse of three-hundred forty-five (345) Kpa pressure air is applied for one (1) second every thirty (30) minutes to regenerate the stationary particulate soot, ash and PAH trap.

The temperature in the one or more stationary particulate and PAH traps is kept below the boiling point temperature of aromatic or other aliphatic hydrocarbon compounds by so spacing the one or more stationary traps relative to the diesel exhaust as to allow sufficient cooling of the exhaust stream at the corresponding trap and/or by heat transfer members that provide such sufficient cooling.

The soot, ash and PAH's collected during pulsed regeneration may be stored in a baghouse and periodically discarded or burned in a combination cyclone/-burner subassembly remotely coupled to the one or more stationary particulate and PAH traps.

The stationary particulate traps may include a cordierite honeycomb filter and/or a R-type mullite corrugation filter, among other particulate traps, and may be provided with a membrane covering the walls defining the pores of the trap.

BRIEF DESCRIPTION OF THE DRAWINGS

These and other objects, aspects and features of the present invention will become apparent from the following description of the presently preferred embodiments thereof and from the drawings, wherein.

DETAILED DESCRIPTION OF THE PREFERRED EMBODIMENTS

Figure 1:
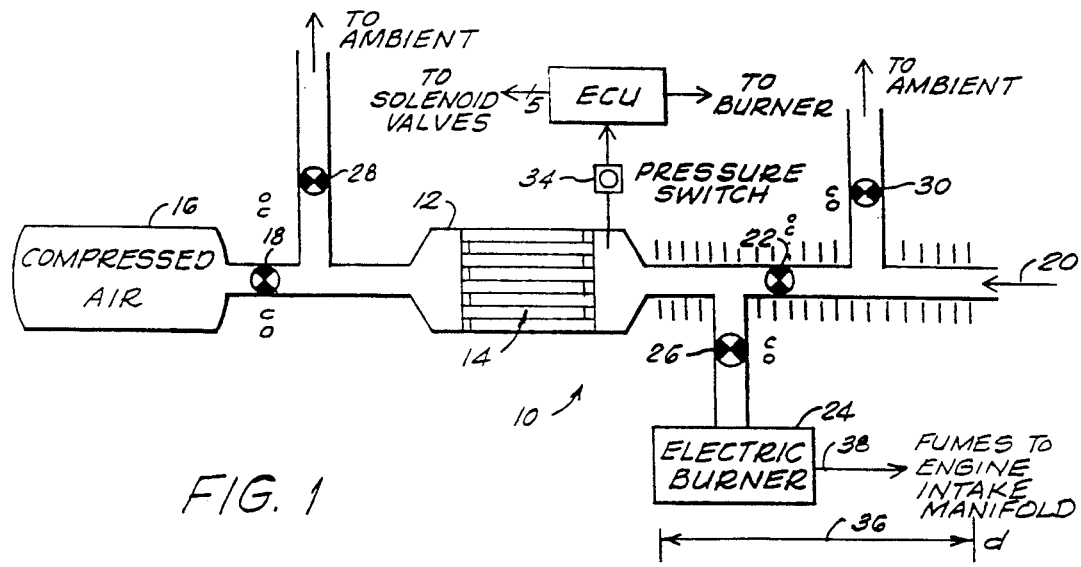
FIG. 1 is a schematic diagram illustrating one embodiment of the diesel particulate and PAH trap in accord with the present invention.

Referring now to FIG. 1, generally designated at 10 is a schematic diagram of one embodiment of the diesel particulate and PAH trap in accord with the present invention. The system 10 includes a casing member 12, such as a steel tube, into which a particulate trap generally designated 14 is rigidly attached, such as by bolted flanges, not shown, in such manner that the trap 14 presents opposing faces that open to either side of the member 12. In the preferred embodiment, two metallic rings, not shown, that fit both sides of the filter 14, hold the filter 14 inside the member 12 using six (6) bolts, not shown, and high-temperature resistant sealing gaskets, such as of red silicone, not shown, are preferably provided between each of the rings and the corresponding face of the filter 14.

The trap 14 may be any suitable diesel particulate and PAH trap, such as ceramic honeycomb monoliths. Exemplary filters that were tested were the NGK C-415 filter with a filtration efficiency of eighty percent (80%); the PANASONIC low-density, light weight R-type mullite fiber ($AL_2O_3$—$SiO_2$) corrugation filter with a filtration efficiency of eighty percent (80%); the CORNING EX-66 with seventy percent (70%) filtration efficiency, and the CERAMEM filter with over ninety-five percent (95%) filtration efficiency. The CERAMEM filter consists of a Corning EX-66 filter coated with a thin (approximately 50 micron) ceramic microfiltration membrane with fine pores (0.5 micron). It may be noted that due to its membrane characteristics, this filter, with its high filtration efficiency, is easily regenerable with back pulsing in a manner to be described, and as a consequence, any possibility for clogging, whether complete or partial, is eliminated.

A compressed air tank 16 is coupled through a valve 18 to one side of the filter 14 disposed in the member 12, and engine exhaust, schematically illustrated by arrow 20, is coupled to the other side of the filter 14 in the member 12 through a valve 22. An electric burner (or bag house) 24 is coupled to the same side of the filter 14 through a valve 26. A valve 28 is provided in a fluid path coupled between the valve 18 and the vessel 12, and a valve 30 is coupled in a fluid path between the engine exhaust 20 and the valve 22. The several fluid valves 18, 22, 26, 28 and 30 are marked by respective indicia "C, O", where the upper such mark indicates either the open (O) or the closed (C) state thereof during normal filtration operation to be described, and where the lower such mark indicates the state thereof during reverse-flow regeneration to be described.

An electronic control unit (ECU) 32 is coupled to the valves 18, 22, 26, 28 and 30, as schematically illustrated by the arrow marked by the number five (5), and is coupled to the burner 24. A pressure responsive switch 34 is coupled between the inside of the member 12 and the electronic control unit 32 to monitor the level of back pressure on the side of the filter 14 that is in communication with the engine exhaust 20. As schematically illustrated by arrow 36, the distance "d" between the diesel exhaust 20 and the member 12 is selected to allow the PAH's and other aliphatic unburnt hydrocarbons in the diesel exhaust to cool to a temperature below their corresponding boiling point temperature by the time they reach the trap 14. Thus, condensation of the PAH's on the carbonaceous soot is achieved. Cooling fins schematically illustrated by vertical marks 38, or other heat transfer means, may also be provided for this purpose.

Figure 2:
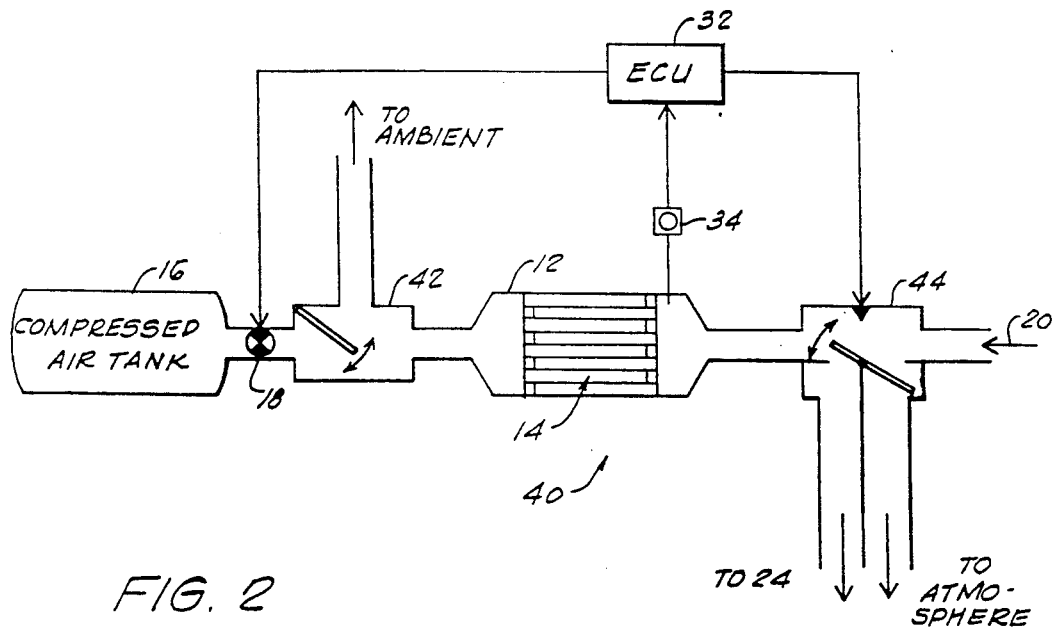
FIG. 2 is a schematic diagram of the embodiment of FIG. 1 illustrating "flip-flap" valves instead of the solenoid valves thereof.

Referring now to FIG. 2, generally designated at 40 is an embodiment of the diesel particulate and PAH trap that uses "flip-flap" valves instead of the solenoid valves of the FIG. 1 embodiment. The embodiment 40 differs from the embodiment 10 of FIG in the respect that a 3-way "flip-flap" valve 42 is positioned between the solenoid valve 18 and the face of the filter 14 confronting the compressed air tank 16 instead of the solenoid valve 28 (FIG. 1) and in the respect that a 4-way "flip-flap" valve 44 is coupled to the electronic control unit 32 and positioned between the engine exhaust 20 and the face of the trap 14 confronting the engine exhaust 20 instead of the three solenoid valves 22, 26, and 30 of the embodiment 10 of FIG. 1.

Figure 3A:
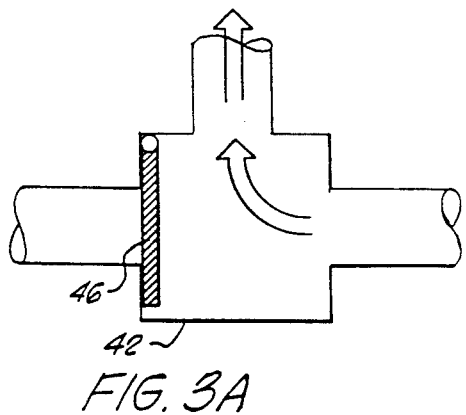
FIG. 3 illustrates in the FIGS. 3A through 3D thereof schematic drawings useful in explaining "flip-flap" valve operation of the diesel particulate and PAH trap in accord with the present invention.
Figure 3B:
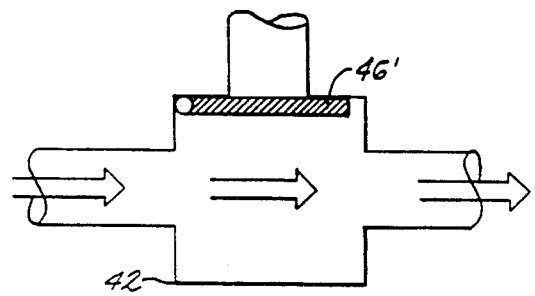

As shown in FIG. 3A, the three-way flip-flap valve 42 has a pivoting flap 46 that is held in the illustrated normal position by gravity during exhaust filtration to be described. During reverse-flow regeneration to be described the pressure of the one or more high-pressure and low-velocity pulses lifts the flap 46 up to the position illustrated at 46' as seen in FIG. 3B to enable each of the one or more pulses to dislodge the PAH-coated soot and ash from the trap 14 in a manner to be described.

Figure 3C:
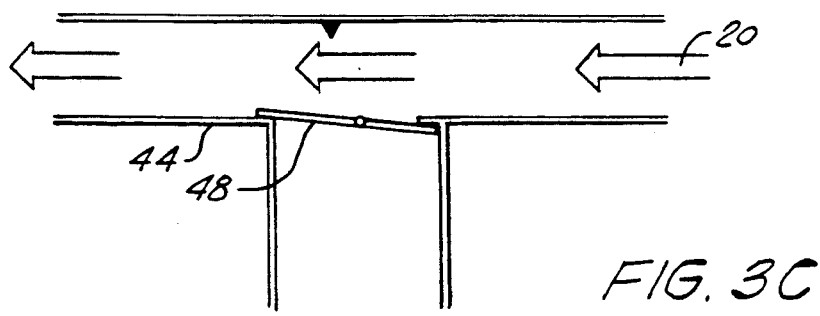
Figure 3D:
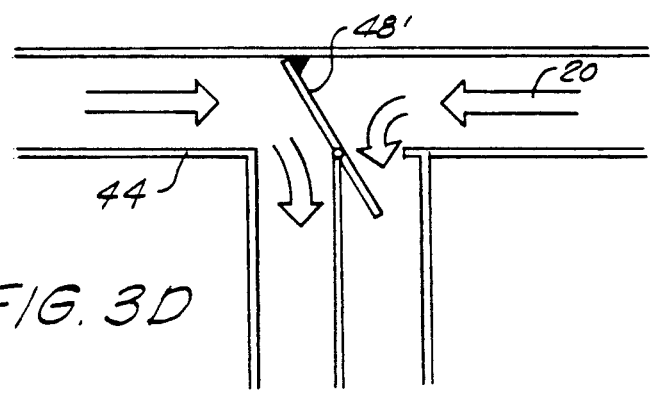

As shown in FIG. 3C, the 4-way flip-flap valve 44 has a pivoting double flap 48 that is held by gravity in the normal horizontal position that allows the engine exhaust 20 to flow toward the ceramic filter during normal filtration mode in a manner to be described. During reverse-flow regeneration to be described a solenoid actuator, not shown, lifts the double flap 48 up to the position 48' as seen in FIG. 3D to enable on the one hand the engine exhaust 20 to be diverted either to ambient or to a parallel filter to be described and on the other to enable the soot, ash and PAH laden air stream to be collected in the bag house or to be oxidized in the burner in a manner to be described. It should be noted that the valve 44 may be operated without a solenoid actuator so long as the pressure of each of the one or more high-pressure low-velocity pulses to be described is sufficient to lift the double flap 48 thereof to the position 48' illustrated in FIG. 3D.

Figure 4:
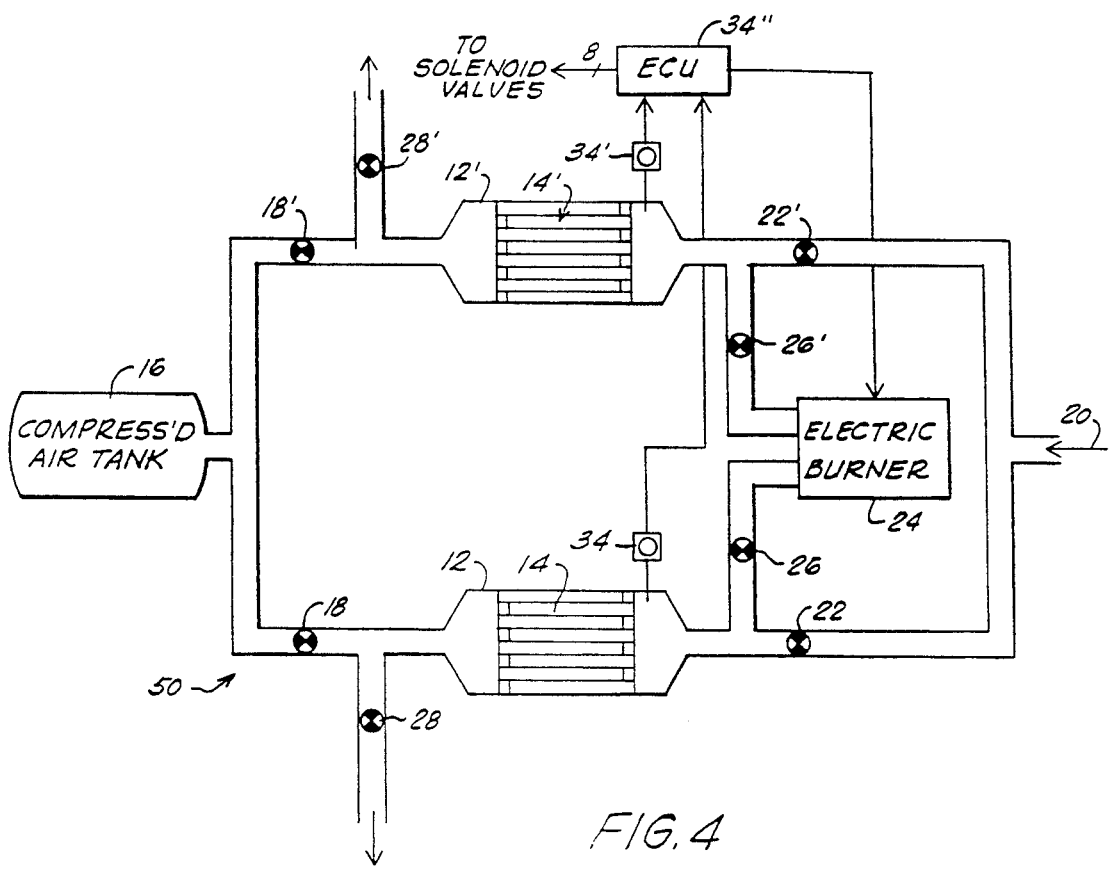
FIG. 4 is a schematic diagram illustrating another embodiment of the diesel particulate and PAH trap in accord with the present invention.

Referring now to FIG. 4, generally designated at 50 is another embodiment of a diesel particulate and PAH trap in accord with the present invention. The embodiment 50 differs from the embodiment 10 of FIG. 1 in the respect that the elements 12, 14, 18, 22, 26, 28 and 34 thereof coupled between the engine exhaust 20 and the compressed air tank 16 are duplicated in parallel by the corresponding elements 12', 14', 18', 22', 26', 28' and 34'; in the respect that the electronic control unit 34" of FIG. 4 is connected to the eight (8) solenoid controlled valves 18, 18', 22, 22', 26, 26', 28, 28', rather than the five (5) valves of the embodiment 10 of FIG. 1; and in the respect that the ECU 34" operates differently than the ECU 34 of FIG. 1 to vent in a manner to be described the exhaust 20 alternately through one of the parallel filters 14, 14' while the other is being regenerated rather than by venting the exhaust 20 to ambient as in the embodiment 10 of FIG. 1 (and 40 of FIG. 2). It may be noted that since the FIG. 4 embodiment never vents the diesel exhaust 20 to ambient atmosphere but always filters the same in one of the parallel traps 14, 14', the solenoid valve 30 (FIG. 1) (and the corresponding structure in FIG. 2), that vents the same to ambient atmosphere, is rendered unnecessary in the embodiment 50 of the FIG. 4. It should be noted that as in the embodiment 40 of FIG. 2 where three-way and four-way flip-flap valves may be substituted for the corresponding solenoid valves of the embodiment 10 of FIG. 1, such flip-flap valves may also be substituted in the embodiment 50 of the FIG. 4.

Figure 5A:
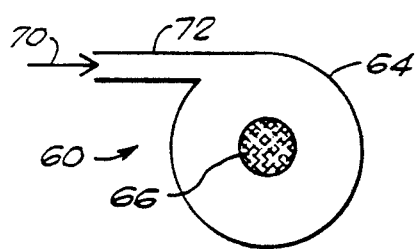
FIG. 5 illustrates in the FIGS. 5A and 5B thereof top and side views of an electric burner of the diesel particulate and PAH trap in accord with the present invention.
Figure 5B:
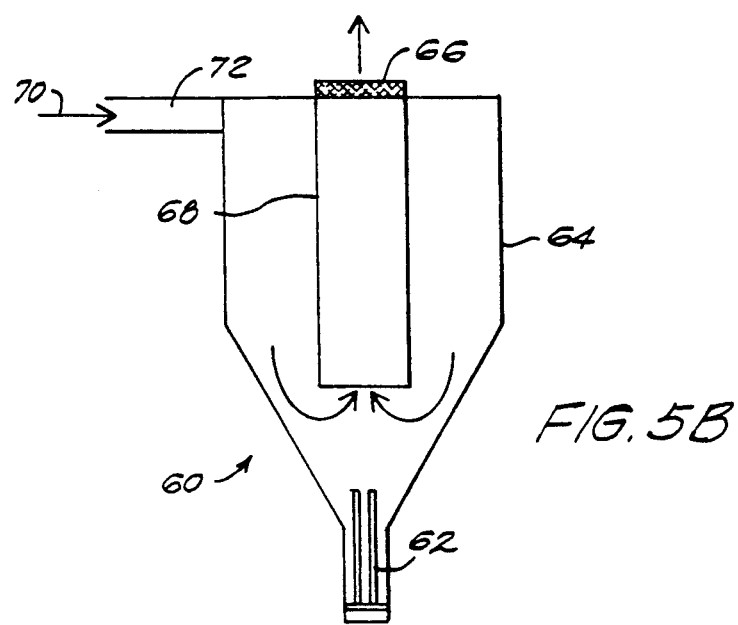

Referring now to FIGS. 5a and 5b, top plan and side sectional views of a presently preferred embodiment of the electric burner device 24 of the embodiments of FIGS. 1, 2 and 4 are illustrated. The burner device 60 consists of an electric heater 62 installed at the bottom of a metallic hopper 64, and a filtering element 66, such as a fabric filter, disposed at an open top mount of an inner cylinder 68 concentrically disposed within the hopper 64 and axially aligned with the heater 62. An air flow schematically illustrated by an arrow 70 carrying the soot, PAH's and ash induced by pulsed reverse-flow regeneration to be described enters the annular space defined between the outer hopper 64 and the inner cylinder 68 through tangential inlet 72, thereby acquiring a rotating and vortical motion. The vortex flow carrying the soot, PAH and ash descends along the walls of the hopper 64 and then rises in the inner cylinder 68 while still rotating, and exits through the filtering element 66. The soot, ash and PAH particles that accumulate on the walls of the cylinders and the filtering element fall into the hopper and are oxidized by the electric heater 62. In place of the electric burner 60 other electric burners may be employed as well within departing from the inventive concept. A soot collector such as a fabric bag made of Nomex Nylon with a vary high capturing efficiency installed in a sealed container could be used as a bag house in place of the electric burner/cyclone subassembly without departing from the inventive concept.

In the normal filtration mode of operation of the single-filter embodiment 10 of the FIG. 1, the exhaust stream 20 from the diesel engine is controllably coupled by the ECU 34 to the soot, PAH and ash trap 14 such that its temperature is below the PAH condensation (boiling point) temperature. As the soot, ash and PAH particulates enter the trap 14, the soot, PAH and ash particulates are captured in the pores of the filter 14 as the exhaust stream 20 is passed therethrough. Downstream of the filter 14, the cleaned exhaust is controllably coupled by the ECU 34 to ambient. In the embodiment of FIG. 1, wherein solenoid valves are employed, the electronic control unit 34 opens the valves 22, 28 respectively leading to the filter 14 and leading away from the filter 14 to ambient to provide the fluid flow path from the engine to ambient while it closes the valves 18, 26, 30 that respectively lead to the pressurized air source 16, the burner device 24, and to the ambient atmosphere. The ECU 34' is operative to provide the same flow paths and connections by means of the valves 42, 44 in the embodiment 40 of FIG. 2.

Figure 6A:
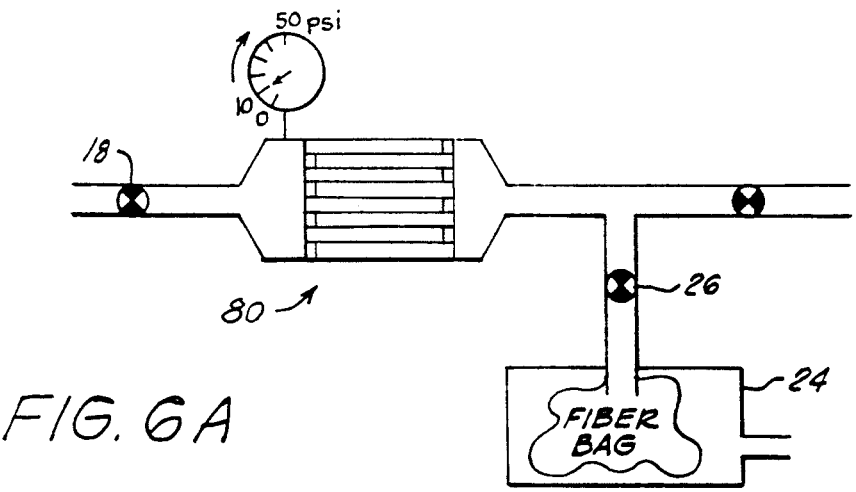
FIG. 6 illustrates in the FIGS. 6A and 6B thereof schematic diagrams useful in explaining one type of regeneration of the diesel particulate and PAH trap in accord with the present invention.
Figure 6B:
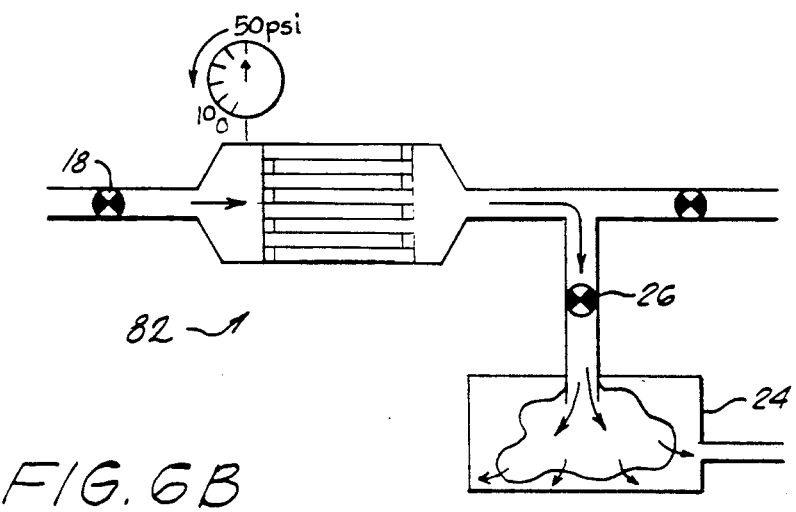

In the reverse-flow regeneration mode of operation of the single-filter embodiment of FIG. 1, the exhaust 20 from the diesel is controllably coupled by the ECU 34 to atmosphere upstream of the filtration element 14 during the time that the filter 14 is being regenerated, at least one pulse of high-pressure and low-velocity (low-mass) air from the compressed air tank 16 is controllably coupled to the side of the filter 14 remote from the diesel exhaust, and the exhaust stream laden with PAH, soot, and ash is controllably coupled to the burner 24. In the embodiment of FIG. 1, wherein solenoid valves are employed, the electronic control unit 34 opens the valves 18, 26 and 30 and closes the valves 22, 28 to provide the flow paths that couple the tank 16 to the member 12, couple the exhaust stream 20 to ambient and the reverse-flow output of the member 12 to the burner 24. The one or more pulses of high-pressure and low-velocity air may be provided from the compressed air tank 16 by controllably opening the solenoid control valve 18 at a low-duty-cycle, for example, about three-tenths (0.3) second each half-hour. The low-duty-cycle of the one or more pulses prevents the consumption of the charge of the air cylinder and ensures the long-life operation of the reverse-flow regeneration subsystem of the invention. The one or more pulses of high-pressure and low-velocity air may also be provided by so controlling the valve 18 at the one end of the filter 14 and the valves 22, 26 at the other side of the trap 14 as to pressurize the member 14 as illustrated generally at 80 in FIG. 6a. When the pressure therein reaches a preselected pressure, the pressure built up in the member 12 is released on a sudden by controllably opening the valve 26 leading to the device 24 (illustrated in FIG. 6 as a collection device) while controllably closing the valve 18 as illustrated generally at 82 in FIG. 6b. In either embodiment, one or more pulses of high-pressure and low-velocity (low-mass) air effectively regenerate the filter 14 dislodging the soot laden with PAH's and ash entrapped therein. The ECU 34 is operative to provide the same flow paths and connects by means of the valves 42, 44 in the embodiment 40.

The embodiment of FIG. 4 operates either by back pulsing or by element vessel pressurization and exhaust (FIG. 6) in the same manner as that of the embodiments of FIGS. 1, 2, except that the exhaust of the diesel is not vented to ambient during pulsed reverse-flow regeneration but rather is controllably coupled by the ECU 34" via valves 22, 22' to one of two or more parallel soot (laden with PAH's) and ash traps 14, 14'; during reverse-flow regeneration to one parallel trap, say the unit 14, the diesel exhaust is fed to the other parallel trap 14', and vice versa. The exhaust 20 is then never vented to the ambient atmosphere during pulsed reverse-flow regeneration in the embodiment of FIG. 4. Each leg of the parallel embodiment 50 of FIG. 4 is otherwise operative in normal filtration and reverse-flow regeneration modes as the embodiments 10 and 40 are operative in these modes, and are not again described herein for the sake of brevity of explication.

In any of the embodiments herein, the regeneration can occur periodically, such as every half hour, or can be triggered whenever the pressure reading as provided by the corresponding sensor 34 of the corresponding particulate trap exceeds a predetermined pressure. Exemplary duty cycles of one-half hour to one hour, pressure ranges of three hundred forty-five (345) KPa to five hundred forty-five (545) KPa, and temperature ranges of one hundred seventy-five (175)° C. to one hundred ninety (190)° C. have been found to be effective.

Figure 7A:
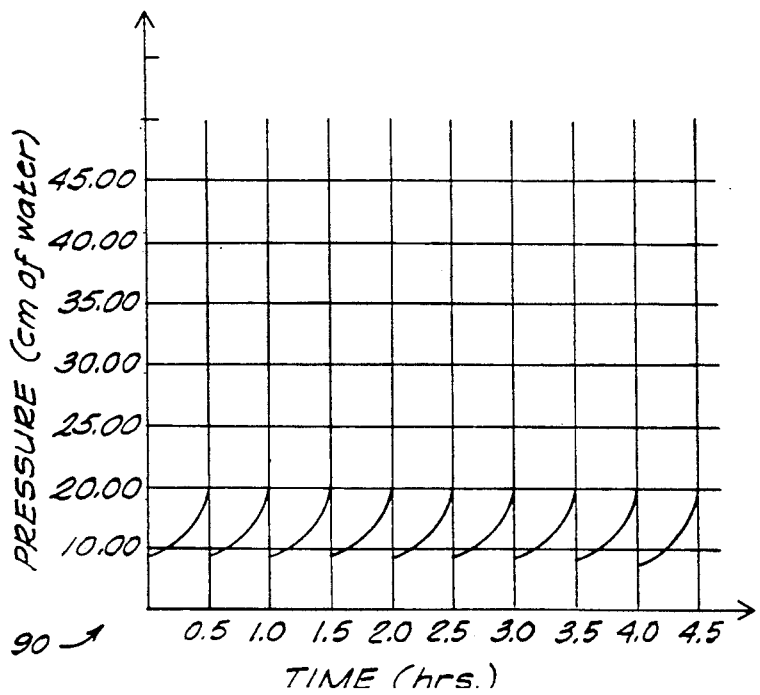
FIG. 7 illustrates in the FIGS. 7A and 7B thereof graphs illustrating the performance of an exemplary embodiment of a diesel particulate and PAH trap in accord with the present invention.
Figure 7B:
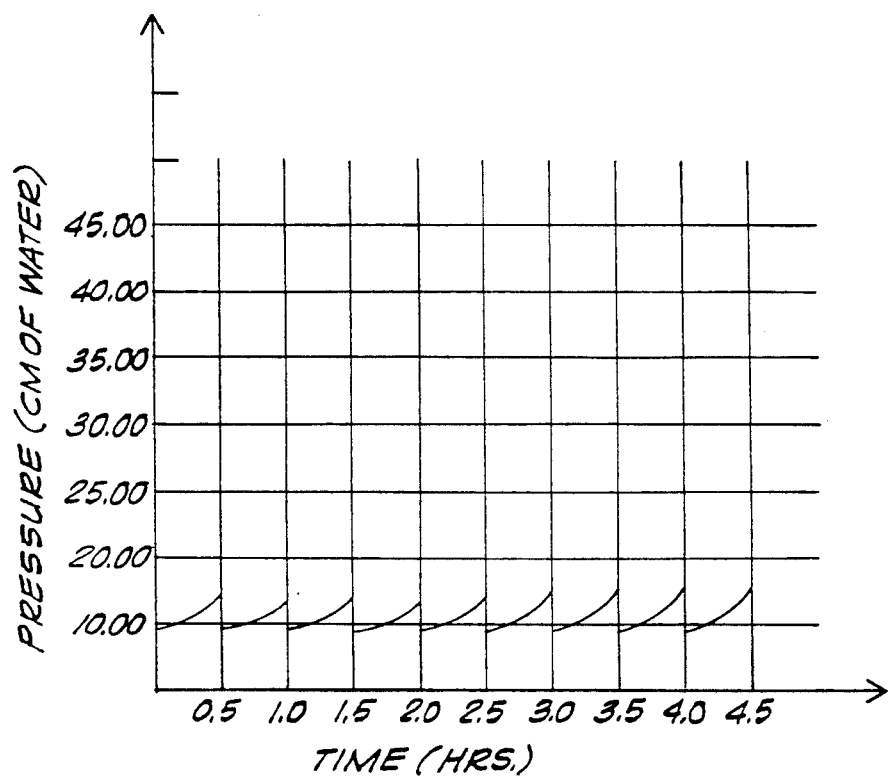

Generally designated at 90 in FIG. 7a and at 92 in FIG. 7b are graphs plotted with pressure as ordinate and time as abscissa that illustrate the performance of the pulsed reverse-flow regeneration subsystem in accord with the instant invention. The graph 90 was compiled from a PANASONIC filter and with regeneration of three (3) pulses at three hundred forty five (345) Kpa every half hour and the graph 92 was compiled from a CEREMEM filter using three (3) one (1) second pulses each at three hundred forty five (345) Kpa every half hour. As shown by the graphs 90, 92, the pulses effectively removed the soot, PAH's and ash as well from the respective filters.

Figure 8:
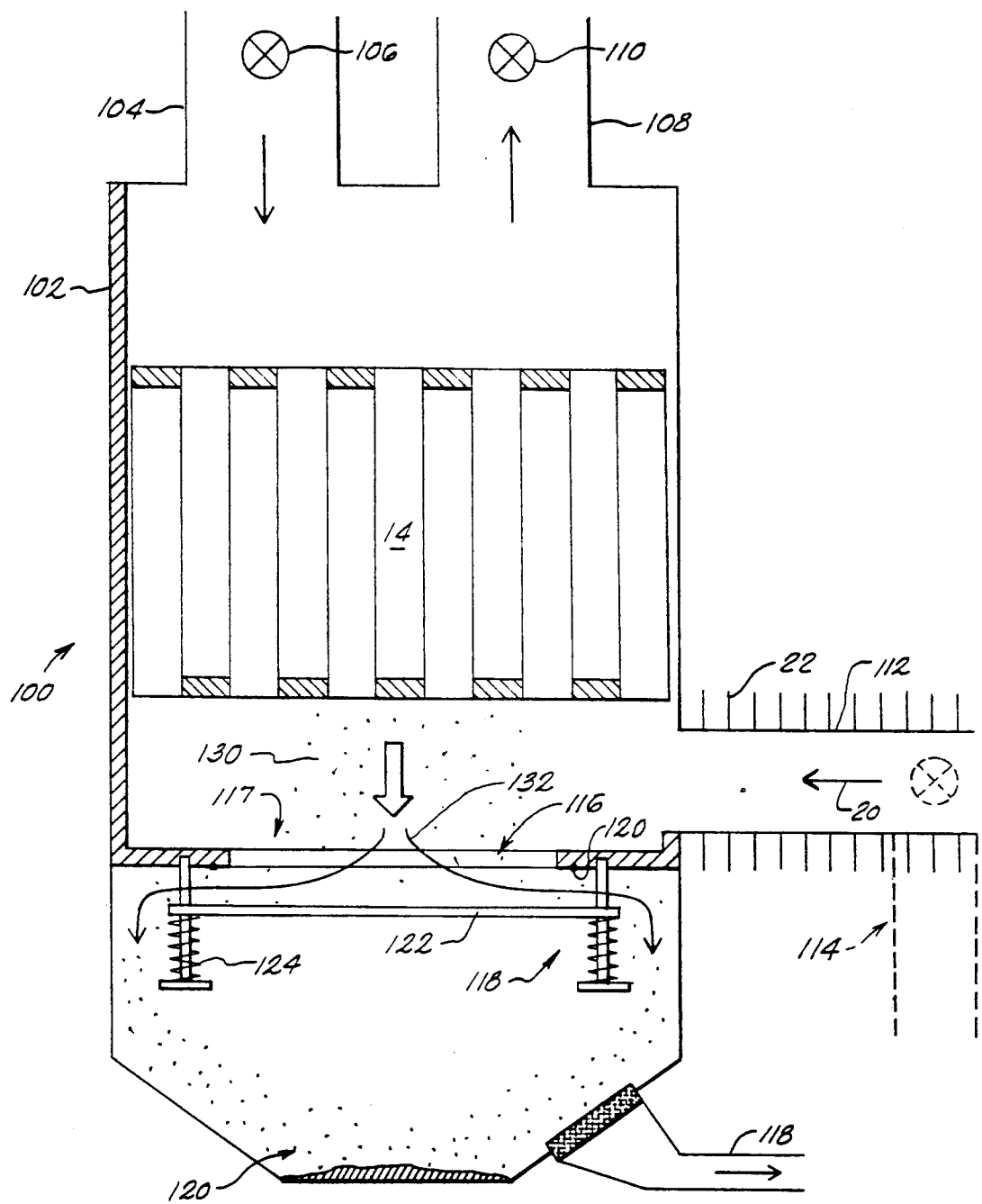
FIG. 8 is a schematic diagram of another embodiment of a pulsed, reverse-flow regenerated diesel trap capturing soot, ash and PAH's in accord with the present invention.

Referring now to FIG. 8, generally designated at 100 is a schematic diagram of another embodiment of the pulsed, reverse-flow regenerated diesel trap capturing soot, PAH's and ash in accord with the present invention. The system 100 differs from the single-filter embodiments heretofore in as much as the trap housing is vertical, not horizontal, in the respect that engine exhaust is fed through the trap during reverse-flow regeneration and in the respect that the burner subassembly is included in the same vertical housing as the trap. The embodiment 100 includes the ceramic filter 14 mounted in housing 102 having a top face and a bottom face. Any suitable mounting means, such as bolted flanges that hold both sides of the filter 14 inside the housing 102 with high-temperature resistant sealing gaskets, both not shown, are preferably provided between the housing 104 and each face of the trap 14.

A first conduit 104 connected to the top of the housing 102 is coupled to a compressed air source, not shown, via a solenoid valve shown schematically at 106, and an exhaust conduit 108 is coupled to ambient via solenoid valve illustrated schematically at 110. Both the conduits 104, 108 open to one face of the trap 14.

A conduit 112 is coupled between engine exhaust schematically illustrated by arrow 20 and the member 102, which conduit opens to the other face of the trap 14.

In an alternative embodiment shown dashed generally at 114, three-way solenoid valve and a conduct that communicates with the diesel exhaust conduit may be provided to vent the diesel exhaust to ambient as in the embodiments heretofore.

Floor generally designated 116 having central opening generally designated 117 is provided in the housing 102 below the trap 14, and a pressure-responsive door assembly generally designated 118 is mounted to the floor 116 in such wise that the opening 117 is closed by the door subassembly 118 during normal filtration mode, but is open during reverse-flow regeneration to allow dislodged particulates to be collected in burner device generally designated 120 mounted to the bottom of the member 102.

The door assembly 118 includes a door 122 end mounted on springs 124 that resiliently bias the door 122 against O-ring subassembly 126 provided on the confronting face of the floor 114.

The burner device 120 may be a coil heater or flame, like propane, butane and the like. A conduit 128 is provided off the combustion region of the burner that is coupled back to the engine intake to burn any PAH's that are revolitized during the combustion process.

Any suitable door assembly 122 may be employed, such as a center-opening door that opens in response to the pressure of the high-pressure and low-velocity regeneration pulses, or an electronically-actuated door, without departing from the inventive concept.

In operation, during normal filtration mode, the valves 106, 110 are controllably actuated by the electronic control unit, not shown, to couple the engine exhaust through the filter and out the engine exhaust output conduit 108; the conduit 104 is held closed by closing the valve 106, while the trap door 122 is held closed by action of the springs 124.

During reverse-flow regeneration, the engine exhaust is coupled to the filter (or alternatively to ambient via solenoid actuated valve 114), the conduit 108 is held closed by closing the valve 110, and the conduit 104 is opened by opening the valve 106.

During reverse-flow regeneration, high-pressure and low-velocity pulses of the type described hereinabove are controllably coupled through the reverse-flow regeneration conduit 104 through the filter 14, which pulses dislodge the accumulated particulates therewithin as schematically illustrated by matrix 130, while the exhaust is being fed therethrough. The pressure of the low-duty cycle, high-pressure and low-velocity pulses acts against the bias provided by the springs 124 and moves the door 122 into its opened condition, whereby the dislodged particulates 130 are forced around the door and are moved into the burner device as schematically illustrated by arrows 132. During the particulate burning process, the conduit 128 couples any PAH's that may revolitize back to the engine, thereby ensuring that they get burned again and absorbed so that no vapors are released to the atmosphere.

It will be appreciated that a conduit may be coupled off the burner device to enable the other embodiments herein to burn revolitized hydrocarbons. It will also be appreciated that engine exhaust may be coupled through the traps of the other embodiments herein during reverse-flow regeneration in alternative embodiments thereof. It will also be appreciated that flip-flop valves may be employed in lieu of the solenoid valves of the embodiment of FIG. 8.

Many modifications of the presently disclosed invention will become apparent to those skilled in the art having benefitted from the instant disclosure without departing from the inventive concept.

What is claimed is:

1. A diesel soot, ash and PAH trap, comprising:
  a stationary trap having walls defining pores that capture soot, ash and PAH particles therewithin that are generated by diesel exhaust;
  a filtered diesel exhaust output port;
  an unfiltered diesel exhaust inlet port;
  a forward flow path along which said trap is disposed between said unfiltered diesel exhaust inlet port and said filtered diesel exhaust output port;
  a carbon soot, PAH and ash particulate disposal unit;
  a reverse flow path along which said trap is disposed defining upstream and downstream portions along said reverse flow path oppositely directed to and coincident with at least a portion of said forward flow path, and with said disposal unit disposed downstream of said trap with respect to said reverse flow path;

an air compressor upstream of said trap along said reverse flow path and a valve assembly coupled between said air compressor and said trap upstream of said trap along said reverse flow path; and a controller operative at comparatively-high duty cycle in a filtration mode for coupling diesel exhaust input at said unfiltered diesel exhaust input port through said trap along said forward flow path and out said filtered diesel exhaust output port and operative at comparatively-low duty cycle in a reverse-regeneration mode for gating said valve assembly to close said filtered diesel exhaust outlet port and to provide at least one pulse of high-pressure and low-velocity air from said air compressor that flows through said trap along said reverse flow path in a direction that dislodges the soot (laden with PAH) and ash particles that are lodged within the pores of said trap during operation in said filtration mode and that moves the soot (laden with PAH) and ash particles into said disposal unit.

2. A diesel soot, ash and PAH trap, comprising:
a stationary trap having walls defining pores that capture soot, ash and PAH particles therewithin that are generated by diesel exhaust;
a filtered diesel exhaust output port;
an unfiltered diesel exhaust inlet port;
a forward flow path along which said trap is disposed between said unfiltered diesel exhaust inlet port and said filtered diesel exhaust output port;
a carbon soot, PAH and ash particulate disposal unit;
a reverse flow path along which said trap is disposed defining upstream and downstream portions along said reverse flow path oppositely directed to and coincident with at least a portion of said forward flow path, and with said disposal unit disposed downstream of said trap with respect to said reverse flow path; and
means operative at comparatively-high duty cycle in a filtration mode for coupling diesel exhaust input at said unfiltered diesel exhaust input port through said trap along said forward flow path and out said filtered diesel exhaust output port and operative at comparatively-low duty cycle in a reverse-regeneration mode for providing at least one pulse of high-pressure and low-velocity air that flows through said trap along said reverse flow path in a direction that dislodges the soot (laden with PAH) and ash particles that are lodged within the pores of said trap during operation in said filtration mode and that moves the soot (laden with PAH) and ash particles into said disposal unit, said means including an air compressor upstream of said trap along said reverse flow path, and means cooperative with said air compressor for producing said at least one pulse of high-pressure and low-velocity air, said producing means including a valve coupled between said air compressor and said filter upstream of said filter in said upstream portion of said reverse flow path and another valve coupled downstream of said trap along said reverse flow path, and means for gating said valve and said another valve so as first to couple the air compressor to said trap along said reverse flow path in order to build up the pressure within said upstream portion of said reverse flow path and then to release suddenly the built up pressure by closing said valve and opening said another valve.

3. The invention of claim 1, further including means for insuring that the temperature of the trap is below the decomposition temperature of selected unburnt hydrocarbons.

4. The invention of claim 6, wherein the portion of the forward flow path between the unfiltered diesel exhaust inlet port and said trap has a preselected length selected to allow entrained PAH particles sufficient time to cool to below their decomposition temperature by the time they reach the trap along the forward flow path.

5. The invention of claim 3, wherein said insuring means includes heat transfer means mounted along the portion of the forward flow path defined between the unfiltered diesel exhaust inlet port and said trap.

6. The invention of claim 1, wherein said unfiltered diesel exhaust is controllably coupled by said controller to ambient at said unfiltered diesel exhaust inlet port.

7. The invention of claim 1, wherein said trap includes an unfiltered diesel exhaust output port, and further including a second trap having walls defining pores that capture soot and ash particles therewithin, and wherein said means controllably couples said unfiltered diesel exhaust output port to said second trap.

8. The invention of claim 7, further including means coupled to said second trap for providing at least one pulse of high-pressure and low-velocity air that flows through said trap in a direction that dislodges the soot, ash and PAH particles that become lodged within the pores thereof.

9. The invention of claim 1, wherein said valve assembly includes a solenoid valve.

10. The invention of claim 1, wherein said valve assembly includes a flip-flap valve.

11. The invention of claim 2, wherein said valve assembly include a solenoid valve 12. The invention of claim 2, wherein said valves include a flip-flap valve.

13. The invention of claim 1, wherein said disposal unit includes a burner.

14. The invention of claim 13, wherein said burner includes a cyclone separator.

15. The invention of claim 13, wherein said disposal unit includes a bag house.

16. The invention of claim 1, wherein said trap is a NGK-415 trap.

17. The invention of claim 1, wherein said trap is a PANASONIC trap.

18. The invention of claim 1, wherein said trap is a CORNING-66 trap.

19. The invention of claim 1, wherein said trap is a CERAMEM trap.

20. The invention of claim 1, wherein said high-pressure and low-velocity pulses are selected from a range of pressures of three hundred forty-five (345) KPa to five hundred forty-five (545) KPa and from a range of temperatures from one hundred seventy-five (175)° C. to one hundred ninety (190)° C.

21. The invention of claim 1, wherein said low-duty-cycle is from one half to one hour.

22. The invention of claim 1, wherein said trap is horizontal.

23. The invention of claim 1, wherein said trap is vertically orientated and includes at its bottom said disposal unit, and wherein a door subassembly is provided between said vertical trap and said disposal unit.

24. The invention of claim 23, wherein said door is opened in response to the pressure of said at least one pulse.

25. The invention of claim 1, further including a conduit coupled to the disposal unit for returning ambient matter back to be reburnt in the diesel engine where exhaust is being filtered.

26. The invention of claim 1, wherein said walls of said stationary trap are disposed in a parallel arrangement to define parallel channels therebetween, said channels extending in line with said unfiltered diesel exhaust inlet port and said filtered diesel exhaust output port.

27. The invention of claim 1, wherein said stationary trap has parallel channels defined by said walls, one end of each channel being blocked, adjacent channels being blocked at opposite ends.

* * * * *

UNITED STATES PATENT AND TRADEMARK OFFICE
CERTIFICATE OF CORRECTION

PATENT NO. : 5,253,476
DATED : October 19, 1993
INVENTOR(S) : Yiannis A. Levendis, et al It is certified that error appears in the above-indentified patent and that said Letters Patent is hereby corrected as shown below:

Column 5, line 52, "vary" should read --very--.

Column 10, line 25, "capture soot and" should read --capture soot (laden with PAH) and--.

Signed and Sealed this

Twentieth Day of September, 1994

Attest:

BRUCE LEHMAN

Attesting Officer          *Commissioner of Patents and Trademarks*